United States Patent

[11] 3,575,048

| [72] | Inventor | Leonard Charles De Benedictis |
| | | Los Angeles, Calif. |
| [21] | Appl. No. | 743,781 |
| [22] | Filed | July 10, 1968 |
| [45] | Patented | Apr. 13, 1971 |
| [73] | Assignee | Union Carbide Corporation |

[54] CALORIMETER FOR HIGH POWER LASERS
8 Claims, 5 Drawing Figs.

[52] U.S. Cl. .................................................. 73/190, 356/234
[51] Int. Cl. ............................................. G01k 17/00
[50] Field of Search.......................................... 73/190, 193; 356/216, 234, 235; 65/36, 49, 50, 59

[56] References Cited
UNITED STATES PATENTS
| 2,521,846 | 9/1950 | Gregory .................... | 65/50X |
| 3,186,743 | 6/1965 | Russell ...................... | 65/59X |
| 3,484,327 | 12/1969 | Denman ..................... | 65/36 |
| 3,483,747 | 12/1969 | Soffer et al. ................ | 73/190 |

Primary Examiner—Jerry W. Myracle
Attorney—Pastoriza and Kelly

ABSTRACT: A calorimeter of the ballistic thermopile type particularly useful for measuring energy in high power pulsed laser beams utilizes a glass filter as the absorbing medium. Since the thermal conductivity of glass is ordinarily poor, a highly thermally conductive material such as a copper disc is bonded directly to the rear surface of the glass. By providing this copper backing to the glass, the absorbing medium comes to thermal equilibrium considerably faster than would be the case in the absence of any backing. The volume of the absorbing medium is relatively small in relation to the usable aperture and the sensitivity is accordingly greatly increased in addition to the feature of a shortened time to arrive at thermal equilibrium.

Patented April 13, 1971 3,575,048

INVENTOR:
LEONARD CHARLES DE BENEDICTIS
BY
Elliott & Pastoriza
ATTORNEYS

CALORIMETER FOR HIGH POWER LASERS

This invention relates generally to calorimeters and more particularly to a calorimeter of the ballistic thermopile type for use with high power pulsed lasers.

BACKGROUND OF THE INVENTION

Calorimeters for indicating the energy in laser beams must be designed with certain specific characteristics. For example, because of the extremely high concentrated energy in a laser beam, the absorbing material of the calorimeter as well as the volume of the absorbing medium must be such as not to be damaged by the impingement of the laser beam thereon. Also, it is important that no reflections occur from the medium back into the laser which could result in feedback which might damage or destroy the laser itself. In addition, it is important that a relatively high sensitivity be realizable in view of the extremely short period of time of actual impingement of the radiation on the absorbing medium. Normally, the smaller the capacity; that is, less volume in a volumetric type of absorbing medium, the greater will be the sensitivity. Finally, and probably one of the most important considerations, is that the calorimeter absorbing medium come to thermal equilibrium as soon as possible after irradiation. If the response time is too slow, the necessity of compensating for energy losses during the lag period must be taken into account.

Heretofore, some of the more damage resistant calorimeters have employed a liquid cell as an absorbing medium. This cell is positioned to intercept the laser radiation and the rise in heat of the liquid in the cell is measured by the usual thermocouples connected to the cell and to a reference mass. To avoid damage to the cell, it is necessary that it be relatively large and contain a relatively large volume of liquid. This relatively large volume of liquid results in an undesirably long length of time for the liquid to come to thermal equilibrium. By the time equilibrium is obtained so that a proper reading can be taken, some temperature loss has occurred and extrapolation from curves is necessary to correct for the error. Moreover, the sensitivity is somewhat lesser than desirable because of the relatively large thermal capacity of the absorbing cell.

Where relatively large cross-sectional laser beams are involved, large apertures are involved for the calorimeter requiring even still larger absorbing mediums so that the foregoing problems are aggravated to a greater extent.

BRIEF DESCRIPTION OF THE PRESENT INVENTION

The present invention provides an improved calorimeter particularly useful for high power pulsed lasers wherein the various foregoing described desirable characteristics are each realized to a considerably greater extent than has been possible heretofore with known types of calorimeters for lasers.

More particularly, the calorimeter of the present invention incorporates a glass filter with a high thermally conductive material bonded to a rear surface of the glass. The use of glass of a neutral density is highly advantageous in that it can intercept relatively high power laser pulses without risk of damage. Further, it can be of relatively small dimensions and thus small capacity so that the sensitivity is greatly increased over conventional-type absorbing mediums. The one disadvantage of glass, when considered alone as an absorbing medium, is its very poor thermal conductivity resulting in an unacceptably long length of time for arriving at thermal equilibrium. This latter disadvantage, however, is overcome in the present invention by the provision of the thermally conductive backing to the glass which results in a surprisingly rapid distribution of heat throughout the glass filter to the end that thermal equilibrium is achieved in a very short length of time.

The total mass of the absorbing medium may be made relatively small in relation to the usable aperture or cross-sectional area of the laser beam. By surface finishing the front surface of the glass aperture in a fine grind, any reflected laser light is completely diffused so that there is no risk of optical feedback.

In the preferred embodiment, a neutral density glass filter of Schott glass is utilized with a backing of copper bonded to the rear surface of the filter by indium solder to provide excellent thermal conductivity between the glass filter and backing.

BRIEF DESCRIPTION OF THE DRAWINGS

A better understanding of the invention will be had by now referring to a preferred embodiment as illustrated in the accompanying drawings, in which.

DETAILED DESCRIPTION OF THE INVENTION

Figure 1:
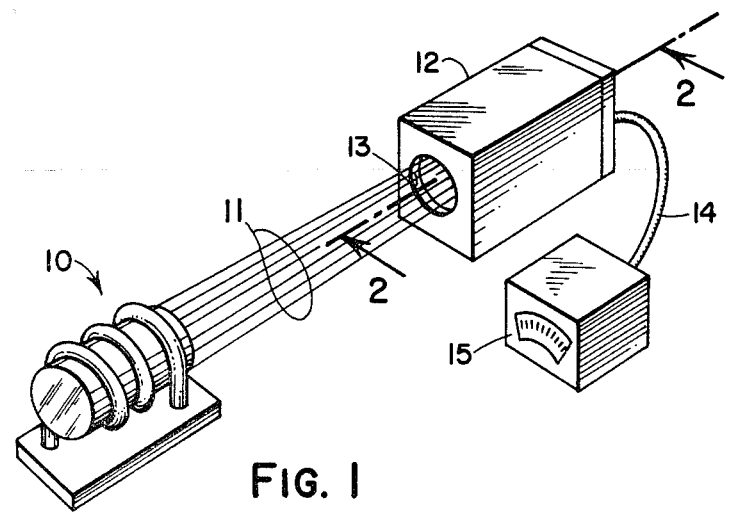
FIG. 1 is a diagrammatic perspective view of a high powered laser and calorimeter for indicating the energy content of the laser beam.

Referring first to FIG. 1 there is schematically indicated at 10 a high power pulsed laser generating a beam of radiant energy 11 towards a calorimeter 12. The calorimeter 12 is of the ballistic thermopile type and includes a front aperture 13 dimensioned to receive the beam 11. A suitable absorbing medium within the calorimeter 12 receives the pulsed beam and its temperature is accordingly increased. Thermocouples in turn provide an electrical output signal constituting a function of the temperature difference between the absorbing medium and a reference mass such as the surrounding housing of the calorimeter 12. This signal is passed through leads 14 to a suitable indicator 15 such as a microvoltmeter.

Figure 2:
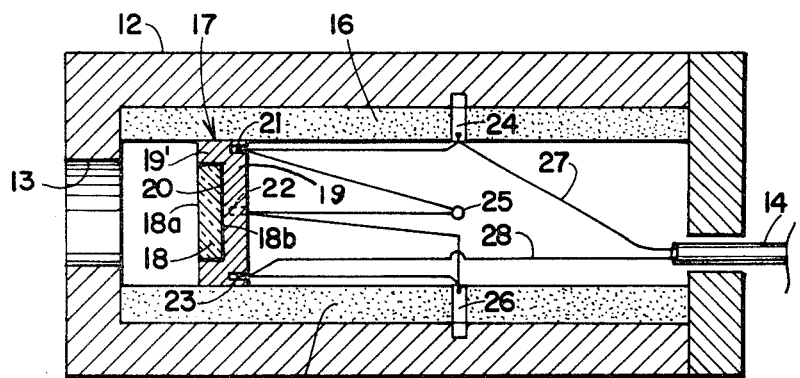
FIG. 2 is an enlarged cross section of the calorimeter taken in the direction of the arrows 2–2 of FIG. 1.

FIG. 2 illustrates in cross section the calorimeter 12 of FIG. 1 wherein the novel absorbing medium is incorporated. As shown, the enclosure 12 constitutes relatively thick metal normally at ambient temperature and serves as a reference mass. Thermal insulation 16, in turn, lines the interior walls of the enclosure 12 and supports the absorbing medium indicated generally by the arrow 17. In accord with the invention, the absorbing medium 17 comprises a glass filter 18 preferably disc-shaped and of a diameter corresponding to that of the laser beam 11 of FIG. 1. The thickness of the glass filter 18 is sufficient such that the same can withstand the irradiation by the beam without damage. This thickness may be of the order of 2 millimeters of a 1-inch diameter beam.

The front surface of the glass filter 18 is indicated at 18a and is positioned normal to the direction of the beam to intercept over its entire area the entire cross section of the beam. A backing material 19 of high heat conductivity, such as copper, in turn is attached or bonded to the rear surface 18b of the glass filter 18. In the particular embodiment enclosed, the backing 19 is in the form of a disc and includes a forwardly extending annular flange 19' overlapping the peripheral edges of the glass disc and terminating in flush relationship with the front surface 18a.

The manner in which the disc 19 is bonded to the glass filter 18 is important. Any type of bonding must necessarily have an excellent thermal conductivity. In this respect, it has been found that pure indium solder provides an excellent bond and the desired high thermal conductivity.

Several thermocouples such as indicated at 21, 22 and 23 are secured to the absorbing medium preferably through small openings circumferentially distributed about the rear surface of the backing 19. All of these thermocouples are connected in electrical series relationship with thermocouples such as indicated at 24, 25, and 26 secured to the reference mass in the form of the enclosure 12. The respective ends of the series connections are shown at 27 and 28 passing to the output line 14.

Figure 3:
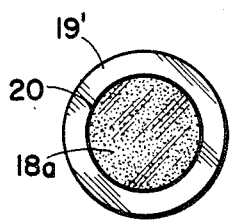
FIG. 3 is a front elevational view of the absorbing medium portion of the calorimeter of FIG. 2.

In the front view of FIG. 3 of the absorbing medium 17, it will be noted that the front surface of the glass filter 18a is finely ground. By providing this type of surface, any laser light reflected from the surface is diffused such that there is eliminated any risk of damaging the laser 10 by optical feedback to the laser from the glass filter.

Figure 4:
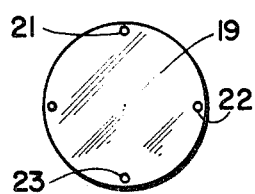
FIG. 4 is a rear elevational view of the absorbing medium shown in FIG. 3.

FIG. 4 shows in rear elevation the manner in which the various thermocouple elements such as 21, 22, and 23 may be circumferentially distributed adjacent to the peripheral edges of the rear surface of the backing 19.

Figure 5:
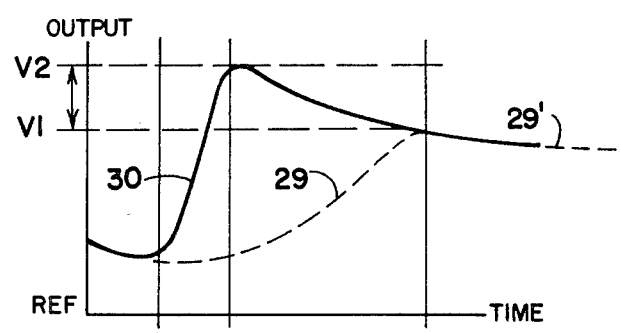
FIG. 5 is a plot useful in explaining the improved sensitivity and thermal response characteristics of the novel absorbing medium of the invention.

In FIG. 5 there is shown a plot of the output signal such as might be read on the meter 15 of FIG. 1 as a function of time during a calorimetric measurement of the laser beam 11. The dotted curve 29 qualitatively represents conventional-type calorimeters wherein a relatively large absorbing medium such as a liquid cell is required for high power pulses such as generated by giant pulse lasers. Because of the relatively large absorbing mass involved, the sensitivity of the measurement is decreased over that which would occur if a smaller mass or capacity were used. Thus, if T1 in FIG. 5 represents the time of impingement of the laser radiation on the absorbing medium, the rate of heating or temperature increase is relatively slow as shown by the dashed curve 29 and by the time thermal equilibrium is attained; that is, when all points in the absorbing medium are of equal temperature, the output reading would be as indicated at V1. This value is clearly less than that temperature which should be attained for the absorption of the radiant energy taking place within the mass. This decreased sensitivity is a direct result of the relatively long time before thermal equilibrium is attained. This time is represented at T3 and the time interval involved is T3 minus T1. In other words, during this time interval there is a loss of temperature by radiation and some conduction as a consequence of unavoidable leakage in the thermal insulation between the absorbing medium and reference mass. To obtain an accurate reading, it is thus necessary to extrapolate back along the decay portion of the curve 29 indicated at 29' to obtain an accurate indication.

The solid line curve 30 in FIG. 5 qualitatively represents the response of the calorimeter when the improved absorbing medium in the form of the glass filter and conductive backing is employed. As shown, the response time to obtain thermal equilibrium is indicated at T2 and this time interval would be T2 minus T1. Because of this considerably shorter response time, the output reading at the point of thermal equilibrium indicated at V2 is considerably more accurate and thus the sensitivity of the overall calorimeter is greatly increased. The increased sensitivity is a consequence of the relatively small volume or mass of the absorbing medium in the form of the glass filter. The rapid response time to attain thermal equilibrium is a consequence of distribution of the thermal energy throughout every point of the glass filter by the conductive backing 19.

In the preferred embodiment of the invention, the glass filter 18 constituted a neutral density 1.0 type Nd—419 Schott glass. The backing material itself preferably constitutes copper but other suitable metallic thermal conductors could be used.

OPERATION

In operation, the laser beam 11 is directed into the aperture 13 of the calorimeter 12 of FIG. 1. The entire cross section of this beam, as described, is intercepted by the absorbing medium in the form of the glass filter 18 shown in FIG. 2. The irradiation of the filter tends to raise its temperature but since glass is normally a poor heat conductor, distribution of a uniform temperature throughout the volume of the glass if used alone would take a relatively long time. With the presence of the high heat conducting backing 19, the heat is distributed relatively rapidly throughout the entire combined mass of the glass and backing.

The temperature response will thus be as depicted by the curve 30 of FIG. 5 and the actual temperature increase due to the laser irradiation can be determined by measuring the potential developed between the thermopile junctions attached to the heated glass and backing and the reference mass in the form of the enclosure 12. This potential will be indicated on the meter 15.

Calibration is best carried out by weight. Since the specific heat capacity and weight of the glass and backing is known, the heat capacity of the system can be readily inferred. Any reflective or scattering losses can usually be calculated or easily measured.

Because of the greatly increased sensitivity and response time as described heretofore in conjunction with FIG. 5, less extrapolation, if any, is required to arrive at the final results.

In actual tests carried out with the novel absorbing medium of this invention, the sensitivity was found to be approximately 10 times as high as in the case of a liquid cell of similar aperture and of similar damage resistance. The response time in turn was reduced from 15 to 30 seconds to approximately 3 to 5 seconds.

The use of the spectral neutral density glass itself enables a very small capacity absorbing material to be provided without damage. Further, by providing the fine grind on the intercepting surface of the filter, as described, the risk of reflections which might couple back into the laser and cause feedback with possible damage or destruction of the laser is substantially eliminated.

From the foregoing, it will thus be evident that the present invention has provided a greatly improved calorimeter particularly useful for high power pulsed lasers wherein all of the various desirable characteristics for such calorimeters are fully realized.

I claim:

1. A subcombination for use in a calorimeter for high power lasers wherein said calorimeter includes a reference mass, said subcombination comprising:
   a. an absorbing material in the form of a glass filter dimensioned to intercept a laser beam without damage;
   b. a backing material of high heat conductivity bonded to the entire rear surface of said glass, whereby thermal equilibrium is attained by said glass in a shorter time than in the absence of said backing material; and
   c. thermocouple means connected to said backing material and adapted to be connected to the reference mass for providing an output signal constituting a function of the temperature difference between the backing material and the reference mass.

2. The subject matter of claim 1, in which said backing material comprises copper of approximately the same thickness as said glass bonded directly to said rear surface by indium solder.

3. The subject matter of claim 1, in which said backing material includes a forwardly extending flange overlapping and bonded to the edges of said glass filter, said flange terminating in flush relationship to the front surface of said glass.

4. The subject matter of claim 1, in which the front surface of said glass is finely ground to reflect any laser light impinging on said front surface in a diffuse form to thereby avoid optical feedback.

5. An improved calorimeter of the ballistic thermopile type for high power pulsed lasers, comprising, in combination:
   a. a reference mass;
   b. a heat absorbing medium;
   c. heat insulation means thermally separating said reference mass from said medium; and
   d. thermocouple means connected to said reference mass and to said medium for providing an output signal constituting a function of the temperature difference between said mass and medium, said medium comprising:

1. a disc-shaped glass filter of cross-sectional area corresponding substantially to the cross-sectional area of a laser beam and of sufficient thickness to avoid being damaged upon absorption of radiation in said beam, said glass filter being positioned normal to said beam to intercept said beam; and
2. a metallic backing of disc shape bonded directly to the entire rear surface of said glass filter and having a thickness corresponding to that of said glass filter whereby thermal equilibrium is attained by said glass filter in a shorter time than in the absence of said metallic backing.

6. The subject matter of claim 5, in which said metallic backing disc includes a forwardly extending annular flange overlapping the peripheral edges of said glass filter and terminating in flush relationship to the front surface, said thermocouple means including thermocouples connected in a circumferentially spaced array to the rear surface of said metallic backing disc such that the same are protected from said radiation, and thermocouples connected to said reference mass, all of said thermocouples being connected in series with each other.

7. The subject matter of claim 5, in which said reference mass defines an enclosure for said absorbing medium, a front wall of said enclosure including an aperture opening in axial alignment with said glass filter, the front surface of said glass filter being finely ground to diffuse radiation reflected therefrom.

8. The subject matter of claim 7, in which said glass filter absorbs at least 50 percent of the impinging radiation.